US006963421B1

(12) United States Patent
Amarger

(10) Patent No.: US 6,963,421 B1
(45) Date of Patent: Nov. 8, 2005

(54) METHOD AND DEVICE FOR THE AUTOMATIC CONFIGURATION OF A PERIPHERAL FOR PROCESSING A COMPUTER DOCUMENT

(75) Inventor: Stéphane Amarger, Chaville (FR)

(73) Assignee: Canon Europa N.V., (NL)

( * ) Notice: Subject to any disclaimer, the term of this patent is extended or adjusted under 35 U.S.C. 154(b) by 988 days.

(21) Appl. No.: 09/704,804

(22) Filed: Nov. 3, 2000

(30) Foreign Application Priority Data

Nov. 4, 1999 (FR) .................................. 99 13816

(51) Int. Cl.[7] .............................................. G06F 15/00

(52) U.S. Cl. .................... 358/1.18; 358/1.9; 358/1.13; 235/375; 345/707

(58) Field of Search ............................ 358/1.18, 1.13, 358/1.9; 235/375; 345/707

(56) References Cited

U.S. PATENT DOCUMENTS 5,353,222 A 10/1994 Takise et al. .......... 364/418.17
5,715,379 A * 2/1998 Pavlovic et al. ........... 358/1.13
5,923,013 A * 7/1999 Suzuki et al. ............... 235/375
6,219,155 B1 * 4/2001 Zuber ......................... 358/1.9

OTHER PUBLICATIONS

Patent Abstracts of Japan, Public. No. 02069268, vol. 014, No. 247, Mar. 8, 1990 (in English).
G.L. Douglas, "Multi-Pass Printing With Automatic Paper Feeding," IBM Technical Discl. Bulletin, vol. 27, No. 7A, Dec. 1984, pp. 3909-3910.
D.P. Anderson, "Techniques for Reducing Pen Plotting Time," ACM Transactions on Graphics, vol. 2, No. 3, Jul. 1983, pp. 197-212.

* cited by examiner

*Primary Examiner*—Twyler Lamb
(74) *Attorney, Agent, or Firm*—Fitzpatrick, Cella, Harper & Scinto

(57) ABSTRACT

A method for the automatic configuration of a computer peripheral for processing a computer document segmented into a plurality of unitary subparts for processing by the peripheral, which includes the steps of acquiring data relating to the processing context; of testing the context data in order to determine the validity of at least one predetermined condition relating to the context data; of modifying the preconfigured order of processing of the subparts of the computer document by means of the computer peripheral, the modification step being implemented if at least one predetermined condition is determined as being valid, in order thus to adapt, in a manner appropriate to the processing context, the order of processing of the subparts of the computer document by the computer peripheral.

19 Claims, 14 Drawing Sheets

METHOD AND DEVICE FOR THE AUTOMATIC CONFIGURATION OF A PERIPHERAL FOR PROCESSING A COMPUTER DOCUMENT

The present invention concerns a method and device for the automatic configuration of a computer peripheral for processing a computer document. In particular the invention aims to optimise the order of processing of sub-parts of a computer document by a computer peripheral.

Computer systems generally have one or more processing peripherals which can be seen as computer tools for processing computer documents, and notably the acquisition, transfer or representation of computer data.

The computer documents processed by these peripherals are mostly segmented into unitary processing sub-parts, for example display pages.

Thus, by way of example, the case can be taken of a printer. If it is a case of a printer of the "recto" type, a unitary processing sub-part comprises a single page of the computer document. On the other hand, if it is a case of a printer of the "recto-verso" type, a unitary processing sub-part comprises two successive pages of the computer document.

For reasons of simplification of vocabulary, the term "page" is hereinafter taken to mean a unitary processing sub-part for the peripheral under consideration.

These pages are ordered in the document in a precise order in the same way as the pages of a book.

The processing peripherals such as printers, facsimile machines or scanners etc., process the pages of the computer documents sequentially in a preconfigured order. In general this order is the logical order of display of the pages in the computer document, that is to say the increasing order of the pages.

However, this order of pre-configured processing of the pages of a computer document by the peripheral is not always suited to the manipulation of the result of the processing by the user.

For example, a printer usually prints the pages of a computer document in the logical order, that is to say in increasing order of the pages. It is also desirable for the manipulation of the printed document, i.e. the result of the processing, to be made as simple as possible for a user, so as to enable him to use all or part of the printed document as quickly as possible.

However, in practice, with a certain type of printer such as so-called "inkjet" printers or those known as "bubblejet" printers, the printed pages of the document are stacked up on top of each other with the printed face upwards. This has the result of reversing the order of the pages in the printed document compared with the logical order of the pages in the computer document. The user must then make tedious manipulations of the printed document in order to put the printed pages back in the correct order.

Moreover, it is seen that, with many types of printer, the speed of printing of the pages varies according to their content: text, image or graphics. This consequently obliges the user to wait until the pages with the longest printing time and which are interposed between text pages, are printed, before being able to recover the text pages which follow and which often contain more useful information.

Thus, in practice, as illustrated by means of the above examples, it is seen that the order of preconfigured processing of the pages of a computer document by a processing peripheral is not always suitable, having regard to the characteristics of functioning of the peripheral or the content of the computer document, for optimum use of the result of the processing by a user.

The present invention aims to remedy these drawbacks.

To this end, the present invention concerns a method for the automatic configuration of a computer peripheral for the processing of a computer document. The computer document is segmented into a plurality of unitary sub-parts for processing by the peripheral. The sub-parts of the document are processed sequentially by the peripheral in a preconfigured order of processing.

According to the invention, this automatic configuration method comprises the following steps:

- acquiring so-called context data relating to a processing context of the computer document, the processing context being defined by the content of said subparts and/or by the operating characteristics of the computer peripheral;
- testing the context data in order to determine the validity of at least one predetermined condition relating to these context data;
- modifying the preconfigured order of processing of the sub-parts of the computer document, this modification step being implemented if at least one predetermined condition is determined as being valid.

By modifying the preconfigured order of processing, the configuration method makes it possible to adapt in an appropriate fashion to the processing context the order of processing of the sub-parts of the computer document by the computer peripheral.

The modification of the configuration is transparent to the user as soon as the latter has triggered the processing of a computer document.

Through the verification of a certain number of predetermined conditions, this modification makes it possible to take into account the content of the document and/or the functional characteristics of the computer peripheral so as to optimise the order of processing of the sub-parts of the computer document.

According to a preferred embodiment in which the processing of the computer document includes a step of generating the orders necessary to the processing and a step of translating these orders by means of a driver for the computer peripheral, in accordance with the invention, the automatic configuration method includes, prior to the step of acquiring the context data, the following steps:

- temporarily storing these orders grouped together by sub-part of the computer document, thus forming a plurality of groups of stored orders, each group being associated with an access data item affording memory access to this group by the driver; and
- temporarily storing the access data associated with these groups of orders, the access data being stored in a predetermined order, which conditions the preconfigured order of processing of the sub-parts of the computer document by the peripheral.

In addition, in this preferred embodiment, according to the invention, the step of modifying the preconfigured order of processing of the sub-parts of the computer document is effected by modifying the predetermined order of the stored access data.

The configuration method makes it possible to modify the configuration of the processing peripheral before the orders are translated by the driver for this peripheral, that is to say transformed so as to be able to be read and implemented by this peripheral.

In practice, each of the groups of orders stored per sub-part of the computer document is stored in a file. In this case, the access data can consist of access paths to these files.

Likewise, provision can be made, independently of the method of storing the groups of orders, for storing the data for access to the groups of stored orders, also in a file.

In this case, the access data are stored in the form of an ordered list.

Thus the manipulation and sequencing of the access data can easily be carried out.

According to a particularly advantageous aspect of the preferred embodiment, the processing context data which are acquired comprise data relating to at least one functional characteristic of the computer peripheral, by means of which, when the associated predetermined condition is satisfied, the result is that, at the end of the processing, the sub-parts of the computer document are ordered in a reverse order compared with the preconfigured processing order. In this case, the aforementioned step of modifying the preconfigured order of processing of the sub-parts of the computer document is accomplished by reversing the predetermined order of the stored access data.

Thus the user does not have to perform a tedious manipulation of the document processed in order to put the sub-parts of the document back in the correct order. Reversal of the sub-parts of the document, once processed, is carried out in a manner which is transparent to the user.

In another particularly advantageous aspect of the preferred embodiment, which can be combined with the aspect mentioned above, the context data comprise data indicative of the type of content of the sub-parts of the computer document. In this case, the step of modifying the preconfigured order of processing of the sub-parts of the computer document is accomplished by the grouping together of the said access data stored as a function of the type of orders contained in the corresponding stored group of orders.

The order of processing of the sub-parts of the document by the peripheral is automatically modified as a function of the content of the sub-parts, so that the sub-parts comprising orders which take longer to process are processed before those which are faster to process.

In practice, when the access data are stored in a file in the form of an ordered list, the grouping together of the said access data is performed by the creation of sub-lists in this ordered list.

Thus the grouping together of the access data is made easy, the access data constituting the components of a list.

According to a characteristic which is preferred when provision is made for the context data to comprise data indicative of the type of content of the sub-parts of the computer document, the step of acquiring context data is preceded by a step of analysing the content of the sub-parts of the computer document.

Thus the context data indicative of the content of the sub-parts of the document are automatically obtained.

In practice, the step of analysing the content of the sub-parts of the computer document is implemented by analysing the orders contained in the groups of stored orders associated with the sub-parts of the computer document.

In a particularly practical manner, when it is a case of depicting a document on a screen or by printing on a paper medium, the temporary storage step is adapted to store graphical orders, and the analysis step includes the following sub-steps:

- seeking the existence or not of open graphical functions;
- seeking the existence of not of closed graphical functions;
- seeking the existence or not of bitmap mode representations; and
- seeking the existence or not of text functions.

The invention also concerns a device for the automatic configuration of a computer peripheral for processing a computer document, the computer document being segmented into a plurality of unitary sub-parts for processing by the peripheral, the sub-parts being processed sequentially by the peripheral in a preconfigured order of processing.

According to the invention, this device comprises:

- means of acquiring so-called context data relating to a processing context of the computer document, said processing context being defined by the content of the subparts and/or by the operating characteristics of the computer peripheral;
- means of testing the context data in order to determine the validity of at least one predetermined condition relating to the context data;
- means of modifying the preconfigured order of processing of the sub-parts of the computer document, the modification means being used in response to the test means when the latter determine the validity of at least one predetermined condition, in order thus to adapt, in a manner appropriate to the processing context, the order of processing of the sub-parts of the computer document by the computer peripheral.

In a preferred embodiment of the invention, the processing peripheral is a printer or facsimile machine.

The present invention also concerns a computer, a printer and a data acquisition system comprising a configuration device according to the invention or means adapted to implement the configuration method according to the invention.

The present invention also concerns a computer communication network including at least one computer and a peripheral for processing a computer document connected to the computer via the network, this computer comprising a configuration device according to the invention.

The invention also relates to a computer program on an information carrier, such as a diskette or a compact disc, characterised in that it implements the configuration method according to the invention, and a storage medium, such as a diskette or compact disc, intended to be read by a data processing system, characterised in that it contains instructions of a program whose execution by the processing system implements the automatic configuration method according to the invention.

The advantages of this device, this computer, this data acquisition system, this network, this computer program and this storage medium are identical to those of the method as succinctly disclosed above.

Other particularities and advantages of the invention will also emerge from the following description.

In the accompanying drawings, given by way of non-limitative examples:

Figure 1:
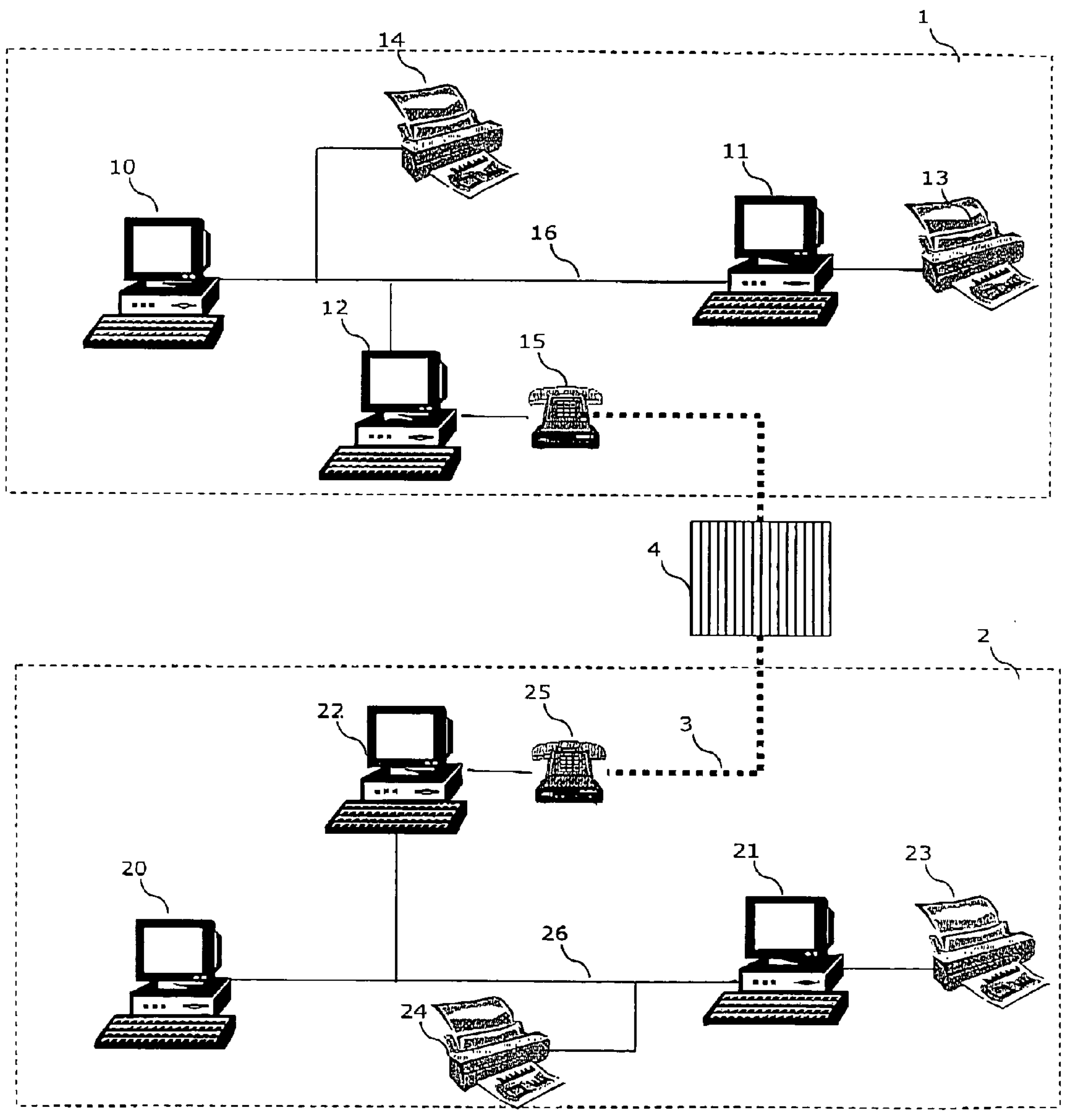
FIG. 1 illustrates a computer communication network adapted to implement the invention.

A description will first of all be given, with reference to FIG. 1, of a communication network adapted to implement the invention. This network 1 includes several computers 10, 11, 12 connected together by a network 16 of a particular type, for example by an Ethernet network.

Processing peripherals can be connected to these computers in order to implement different types of processing of a document.

In this example, the processing peripherals are printers 13, 14.

Naturally, other processing peripherals could be connected to the network 1, and notably a facsimile machine, a modem, a scanner, an electronic whiteboard including or connected to a printer, and more generally any device for acquiring or depicting computer data.

These peripherals can be connected to the network 1 either directly like the printer 14, or through a computer 11 like the printer 13. The connections used for connecting the peripherals to the network 1 and to the computers are of appropriate types normal in computer networks: serial, parallel or SCSI ("Small Computer Simple Interface").

This first network 1 can itself be connected to a second network 2 which also includes a certain number of computers 20, 21, 22 connected together by a network 26, and printers 23, 24 as processing peripherals.

The computers 12, 22 in the two networks 1, 2 are connected respectively to a modem 15, 25 which are themselves connected by means of a network 3, and by way of non-limitative example via a switch 4 which is situated at an Access Provider common to the two networks 1, 2.

This structure enables the two networks 1, 2 to communicate so that a user of a first network 1 can use the components and notably the peripherals of the second network 2 as if they belonged physically to the first network, and vice-versa.

For example, a document stored on the computer 11 of the first network can not only be printed on the printers 13 or 14 of the first network but also on the printers 23 or 24 of the second network.

A description will now be given of the structure of the automatic configuration device which can be incorporated in one or more of the computers 10, 11, 12, 20, 21, 22 of the communication networks 1, 2 described above.

Figure 2:
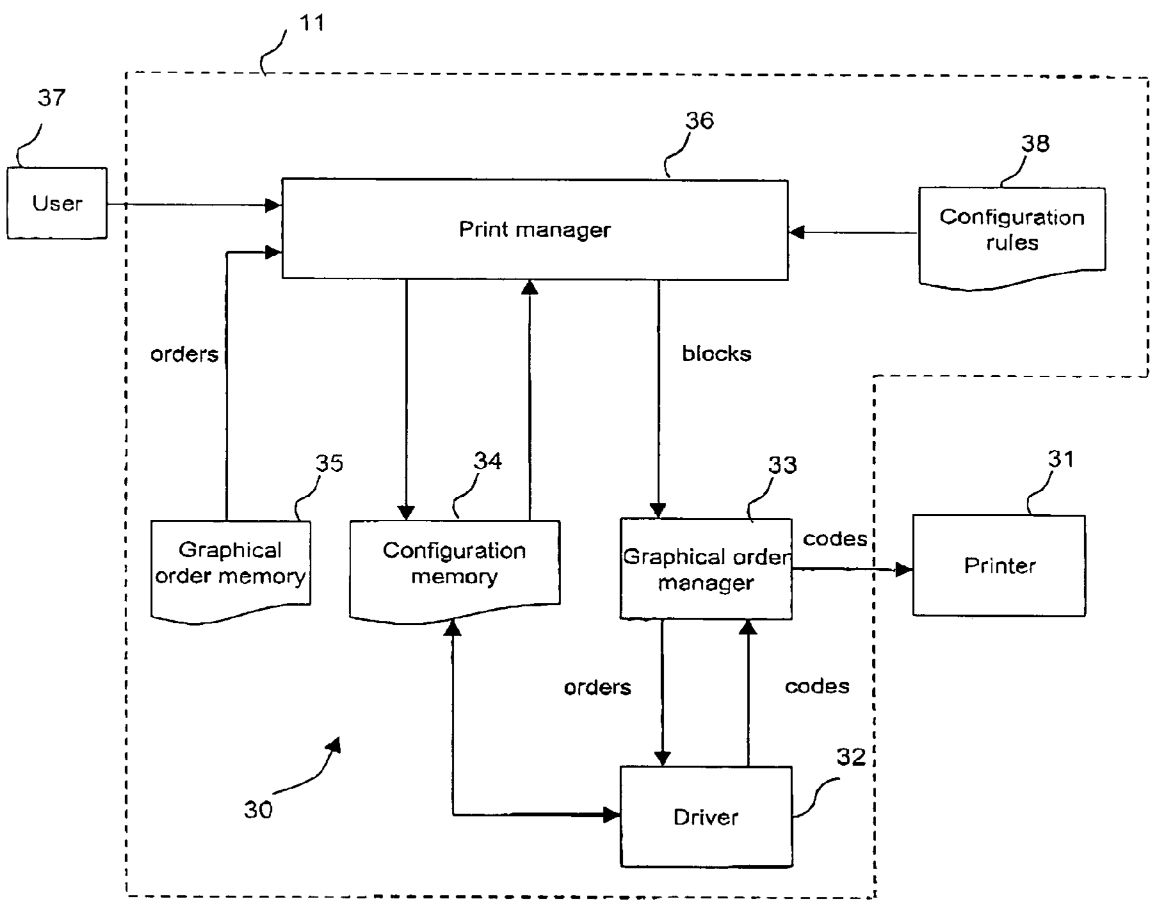
FIG. 2 illustrates a computer configuration device according to one embodiment of the invention.

This automatic configuration device 30, as illustrated in FIG. 2, makes it possible to configure a computer peripheral for the processing of a computer document.

In the remainder of the description, the peripheral most often considered non-limitatively is a printer 31.

In a known manner, a printer 31 is controlled by a driver 32, which is a software module which is situated in a computer system including a processor, such as a computer. This module is dedicated to communication with another system having its operating software for performing a set of elementary operations.

The driver 32 thus translates a complex operation required by a high-level software application into a set of elementary operations which can be executed by the printer. The driver thus effects a translation of a set of orders, for example graphical orders sent by a graphical order manager 33, into a set of codes which can be read by the computer 31.

The configuration of a driver 32 amounts to fixing the value of each parameter of this translation. These parameters concern for example the translation of the character font of a text into a series of dots able to be formed by the printer 31, or the colour palette of a document into a colour palette of the printer 31.

This configuration of the driver 32 is thus stored in storage means 34 for the configuration of the printer 31.

The configuration device has means 35 for the temporary storage of orders, here graphical orders.

These orders are of the type "draw a line", "draw an ellipse", "draw a representation in bitmap mode" for example.

These temporary storage means 35 are adapted to store orders grouped together by page of the computer document to be printed.

For example, in a computer system managed under the operating system known as Windows® from Microsoft, the graphical orders sent by an application are received by a graphical order manager (referred to as GDI in Windows®) and stored in EMF files (Enhanced MetaFiles), each file corresponding to a document page.

An SPL file ("Spool File") is also created in order to list all the references or data for access to the existing EMF files for the document and also store the configuration of the driver 32 as parameterised at the time when the application initiates the printing of the document.

Thus, in Windows®, the means of storing the configuration 34 are incorporated in the SPL file.

Typically, these access data are composed, for each EMF file, of the file name and the path to gain access to it.

In the SPL file, all the EMF file access data are listed in the form of a list of elements. The elements in this list being ordered according to the order of the pages in the computer document.

Conventionally, a print manager 36 (referred to as Print Processor under Windows®) recovers the graphical orders stored in the EMF files by means of the access data listed in the SPL file, and sends them in blocks to the graphical order manager 33, which in its turn transmits them to the driver 32.

The print manager 36 first of all reads the data for access to the EMF file containing the graphical orders of the first page of the computer document, and then continues with the access data corresponding to the orders of the previous page and continues thus as far as the access data corresponding to the orders of the last page. Thus it recovers and sends the graphical orders to the graphical order manager 33 in blocks corresponding to the pages of the computer document in the order of these pages in the computer document.

The driver 32 translates these orders in the form of codes, from the configuration as stored in the SPL file. The codes are returned to the graphical order manager 33 and are then sent to the printer 31, which can thus effect the printing proper of the document.

Thus it can be considered that the printer is preconfigured in order to print the pages of the computer document in the logical order of the pages in the document.

Naturally, in a printing system in which there is no temporary storage of the graphical orders in EMF files, the configuration device according to the invention has specific means of storing graphical orders which stem from the application.

In the scope of the description of the present invention, the processing context of said computer document is defined by the computer peripheral in question, for example a printer as including information relating to the types of data—for example text, image, graphics or a combination of these types—contained in the pages of the computer document, as well as information concerning functional characteristics of the computer peripheral.

If it is a case of a printer, these functional characters can be:

a printer of the "inkjet" type or "bubblejet" type;
a printer of the type printing "recto-verso";
etc.

In accordance with the invention, the configuration device also has means of acquiring data relating to the context of the processing of the computer document by the printer.

These means of acquiring data relating to the context are preferably incorporated in the print manager 36 (Print Processor under Windows®).

In this preferred embodiment, the general means of acquiring data relating to the processing context are subdivided into:

means of analysing the content of the computer document from the orders stored in the EMF files;
means of acquiring predefined functional characteristics of the printer.

In practical terms, when it is a question of representing a document, on a screen or by printing on a paper medium, the stored orders are graphical orders, and the analysis means are adapted to seek the existence or not of open graphical functions, closed graphical functions, representations in bitmap mode and text functions.

Functional characteristics as cited above can be obtained by consulting the printer driver 32.

According to the invention, the configuration device has means of testing the data relating to the context of the processing of the computer document, these data previously having been acquired by the aforementioned acquisition means.

In the embodiment chosen and depicted, these context data testing means are preferably incorporated in the print manager 36.

The results of the testing are compared with predetermined conditions. These conditions are for example:

"the printer is of the inkjet type";
"the printer is of the bubblejet type";
"the printer is of the recto-verso type";
"the computer document contains only text";
"the computer document contains text and images";
"the computer document contains text and graphics";
etc.

In practical terms, these conditions are stored in the code of the program 5100 in the ROM 51. As a variant, these conditions can be supplied by a user through an adapted interface.

According to the invention, at the end of the test carried out by the testing means, the conditions which are satisfied are determined.

Likewise, the configuration device has modification means adapted to modify the preconfigured order of processing of the pages of the computer document by the printer.

These modification means are preferably also incorporated in the print manager 36.

In this embodiment, the preconfigured order of processing is modified by acting on the order in the list of the SPL file of the data for access to the files containing the graphical orders grouped together by page of the computer document.

The order of the access data in the SPL file is modified according to the result of the test carried out by the testing means, that is to say according to the validity of the predetermined conditions.

The way in which this order is modified according to the validity of the predetermined conditions will be detailed below, in relation to the description of the method implemented by the device according to the invention.

Figure 3:
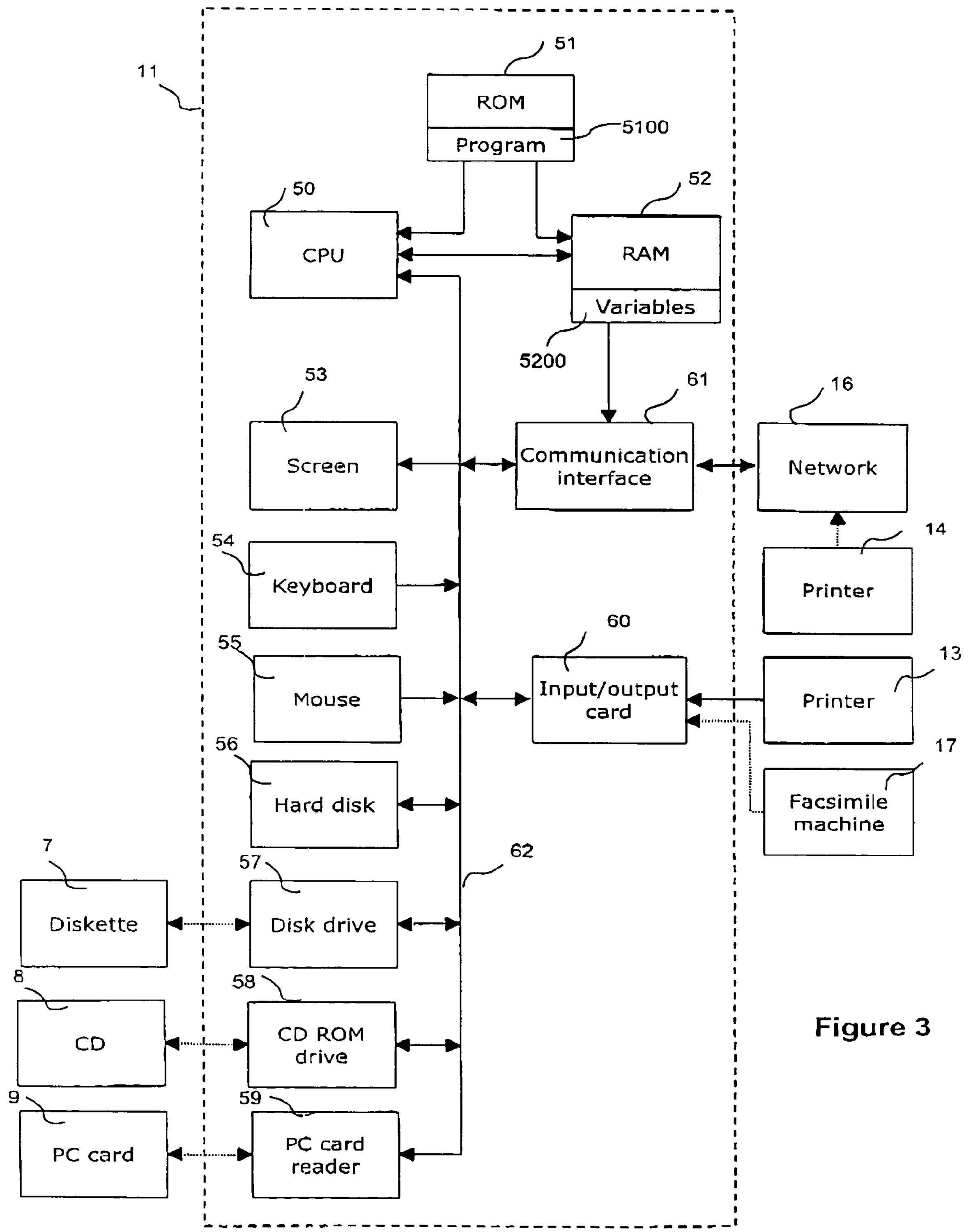
FIG. 3 depicts schematically a computer adapted to implement the configuration method according to the invention.

All the aforementioned means of the configuration device are incorporated in a computer 11 as illustrated in FIG. 3.

More precisely, the configuration device is incorporated in a microprocessor 50 (CPU), a read only memory 51 (ROM) being adapted to store a program 5100 for automatically configuring a peripheral for processing a computer document, and a random access memory 52 (RAM) containing registers 5200 for storing the variables modified during the running of this program.

This microprocessor 50 is integrated into the computer 11, which can be connected to different peripherals, for example a printer 13 or a facsimile machine 17, by means of an input/output card 60, in order to be able to process the documents, and notably to print them.

This computer 11 has a communication interface 61 connected to the communication network 16 in order to transfer or receive documents via the network 1 and receive or send information. The computer 11 can, through the network 16, be connected to another printer 14.

The computer 11 also has document storage means, such as a hard disk 56, or is adapted to cooperate, by means of a disk drive 57, a compact disc drive 58 or a computer card reader 59, with removable document storage means, respectively diskettes 7, compact discs 8 (CD-ROMs) or computer cards 9 (PC Cards).

These fixed or removable storage means can also contain the code of the configuration method according to the invention which, once read by the microprocessor 50, will be stored in the hard disk 56.

By way of variant, the program enabling the configuration device to implement the invention can be stored in the read only memory 51.

In a second variant, the program can be received in order to be stored as described previously by means of the communication network 16.

The computer 11 also has a screen 53 serving for example as an interface with a user 37 by means of a keyboard 54 or a mouse 55 or any other means.

The central processing unit 50 will execute the instructions relating to the implementation of the invention. On powering up, the programs and methods relating to the invention stored in a non-volatile memory, for example the read only memory 51, are transferred into the random access memory 52, which will then contain the executable code of the invention as well as the variables necessary for implementing the invention.

The random access memory 52 thus contains registers for the temporary storage of the graphical orders and for storing the configuration of the driver 32.

The read only memory 51 can store all the prerecorded configurations 38 as well as the code of the program to be executed in order to automatically configure the order of processing of the pages of the computer document.

A communication bus 62 affords communication between the different sub-elements of the computer 11. The representation of the bus 62 is not limitative and notably the microprocessor 50 is able to communicate instructions to any sub-element directly or by means of another sub-element.

A description will now be given of the method of automatic configuration of the computer peripheral used by this device with reference to FIGS. 4 to 13.

Figure 4:
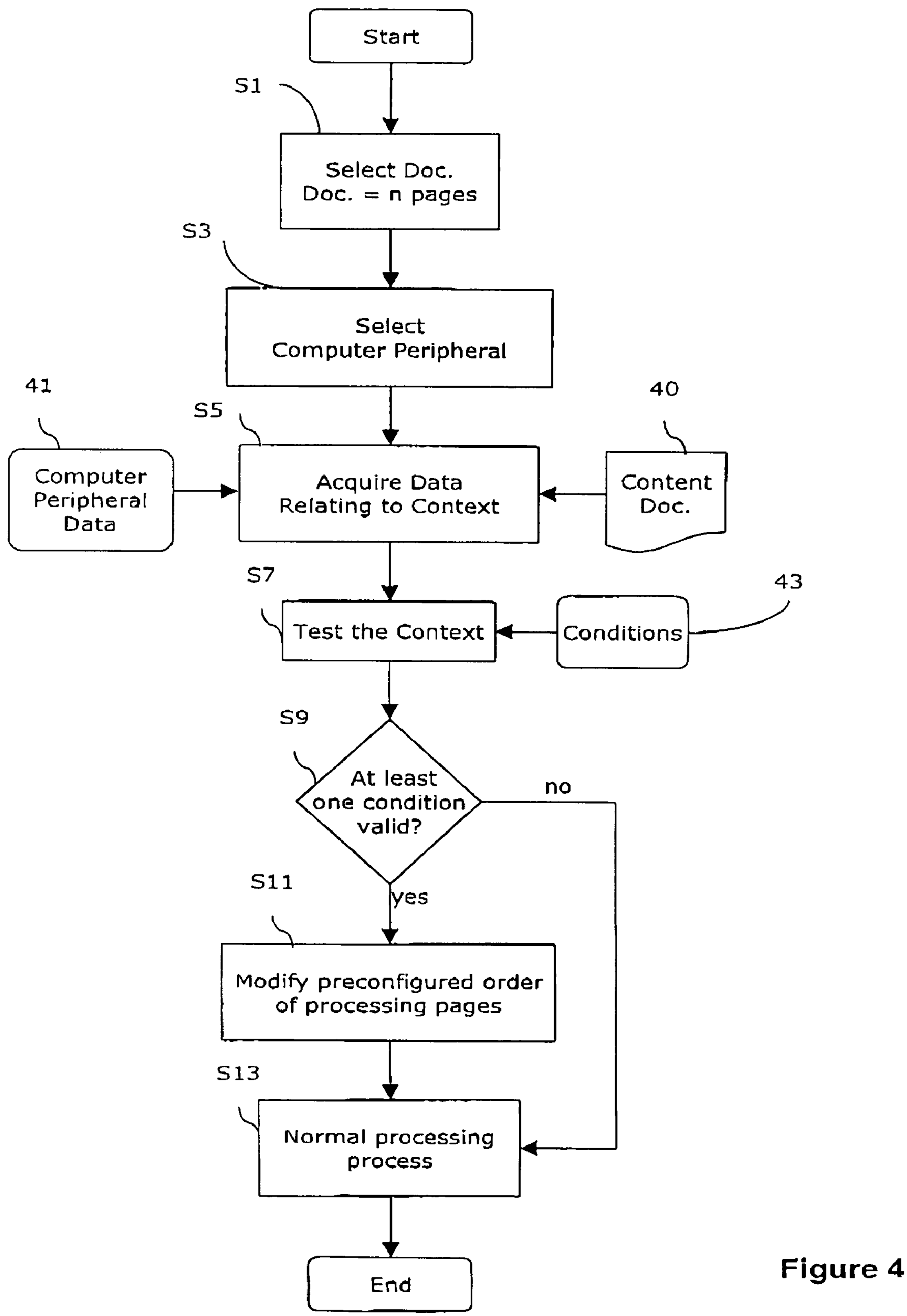
FIG. 4 depicts a flow diagram illustrating in general terms the method for the automatic configuration of the order of processing of the pages of a computer document by a computer peripheral, according to the present invention.

FIG. 4 illustrates in general terms the method of automatic configuration of the order of processing of the pages (or unitary processing sub-parts) of a computer document.

In order to begin the processing of a computer document by a computer peripheral, the user in general commences by selecting (S1) the computer document. This document contains a certain number n of pages.

The user continues by selecting (S3) the computer peripheral for the processing in question. For example, if the peripheral is a printer, it may be a case of a local printer for the computer in which the document is stored.

At step S5, the means of acquiring data relating to the context of the processing (hereinafter referred to as "context data") are used to acquire these data. As explained previously, these context data can include data 40 relating to the content of the computer document, and data 41 concerning functional characteristics of the computer peripheral.

The following step S7 is the step of testing the context of the processing characterized by the context data obtained at the previous step. As explained previously, the context is tested with respect to the predetermined conditions 43 (hereinafter referred to by the expression "context conditions") which relate to the content of the computer document and/or to the functional characteristics of the peripheral.

The following step S9 is a decision step in which it is determined whether at least one of the context conditions 43 has been tested as being valid. In the negative, the process of processing the computer document continues normally (S13), keeping the order of processing of the pages of the document which is preconfigured in the peripheral.

Conversely, in the affirmative, at step S11, the preconfigured order of processing the pages of the computer document is modified in accordance with the present invention, in order to adapt in an appropriate manner, to the context of the processing, the order of processing of the pages of the computer document by the computer peripheral.

Finally, at step S13, the normal process of processing the computer document continues but this time with an order of processing of the pages of the document which is modified compared with the preconfigured order.

A description will be given below of the automatic configuration according to a preferred embodiment of the invention.

Figure 5:
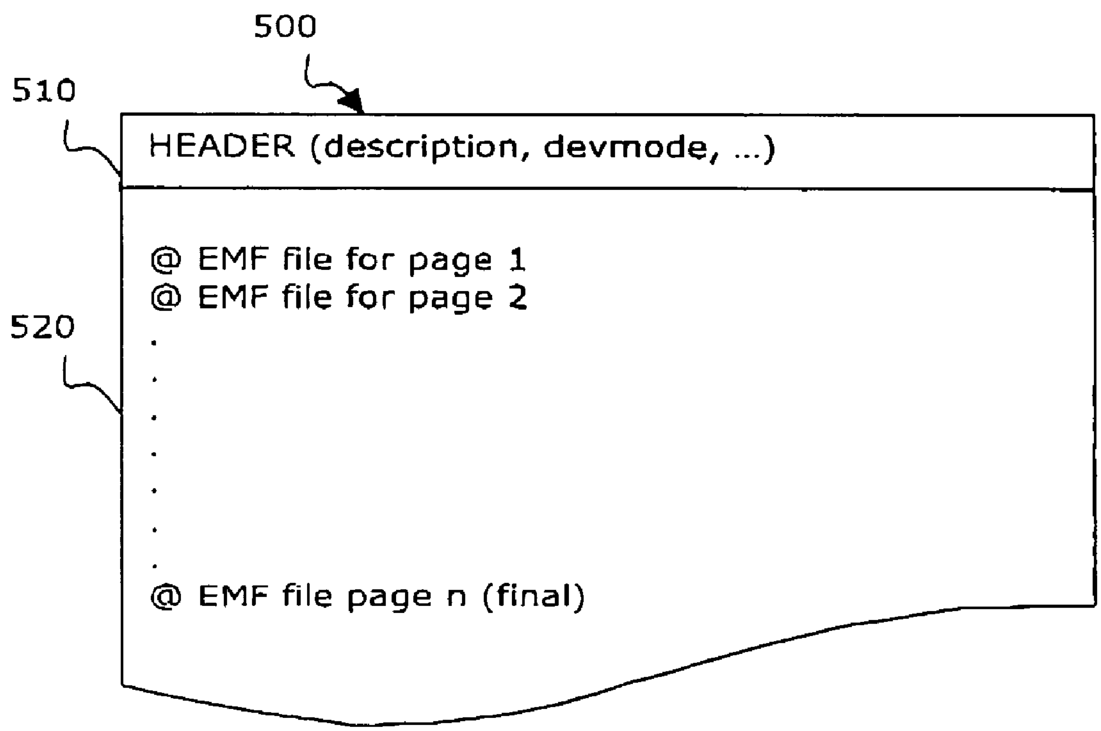
FIG. 5 depicts schematically the structure of an SPL file in accordance with the Windows® operating system.

With reference to FIG. 5, the structure of an SPL file in accordance with the Windows® operating system is described schematically.

An SPL file 500 in accordance with the Windows® operating system comprises a header area 510 which contains the parameters related to the physical configuration of the printer.

This header area 510 is followed by a data area 520 which contains the list of access data. These access data are in reality the paths to the EMF files which enable the print manager 36 to recover the graphical orders stored in the EMF files. Each EMF file contains the graphical orders corresponding to a page of the computer document to be printed. These access paths are presented symbolically in the figure by the character "@".

Figure 6:
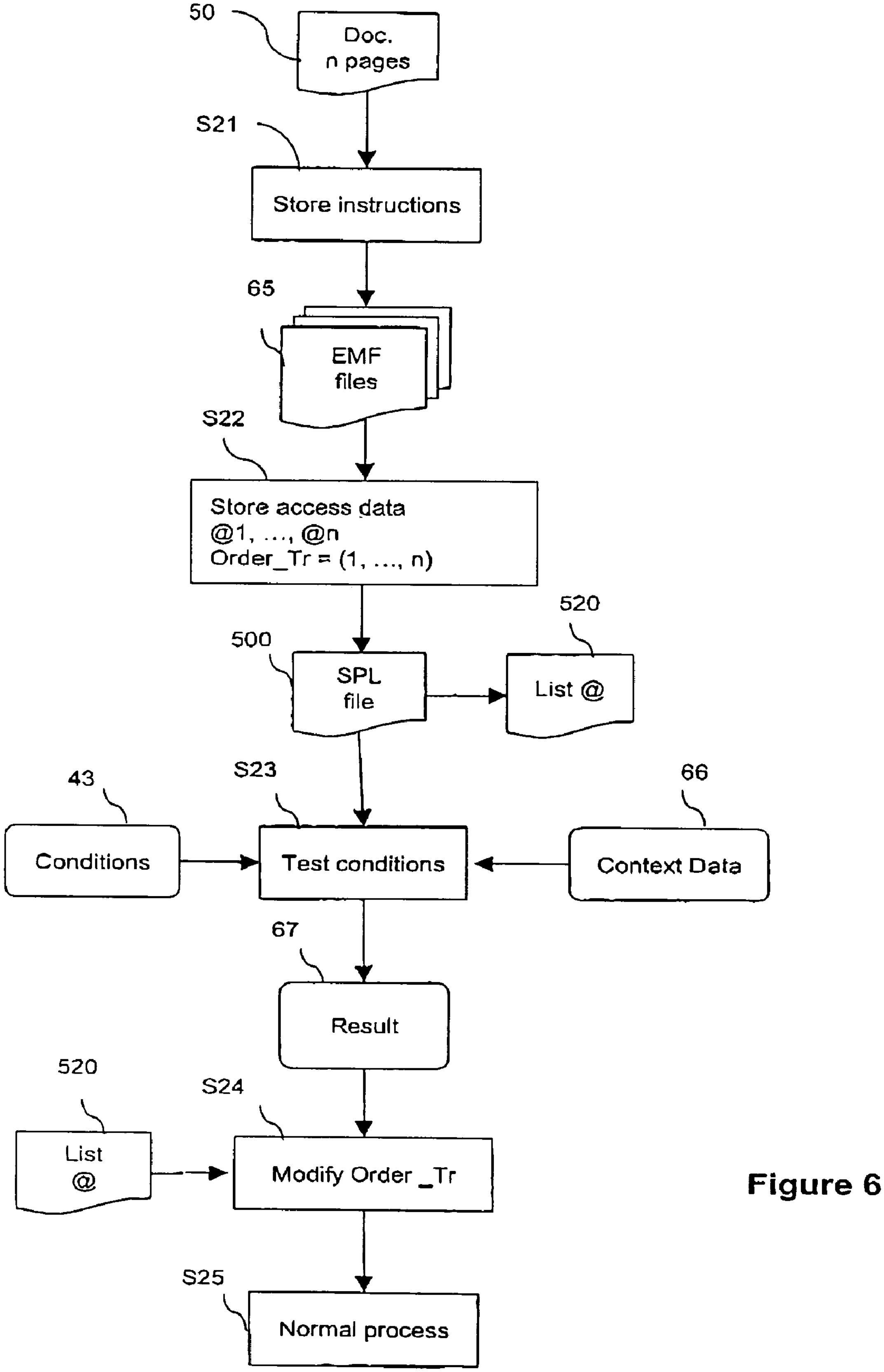
FIG. 6 depicts a general flow diagram illustrating the method for the automatic configuration of a printer allowing optimisation of the order of printing of the pages of a computer document in conformity with a preferred embodiment of the invention.

With reference to FIG. 6, a description will now be given of the preferred implementation of the automatic configuration method illustrated in general terms in FIG. 4. In this preferred mode, the peripheral is a printer and implementing the method makes it possible to optimise the order of printing of the pages of a computer document.

In FIG. 6, when the user initiates the printing of a document 50 containing n pages by a printer, for example a local printer for the computer on which the document is stored, the graphical orders are sent by the application to the driver 32 for the printer 31, by means of the graphical order manager 33, with a view to the translation of these orders by the pilot 32.

Before this step, the configuration method according to the invention includes a step of temporary storage S21 of the graphical orders.

In Windows®, this step is implemented by storing the graphical orders in EMF files 65. These files thus form a buffer which makes it possible to release the application throughout the printing and notably whilst the driver is processing the graphical orders sent to it.

The graphical orders are thus grouped together by page of the computer document.

At step S22, the access paths (@1 . . . @n) of the EMF files associated with each of the pages (1 to n) of the document 50 to be printed are then temporarily stored in the SPL file 500 in the form of an ordered list 520 (FIG. 5). This list is hereinafter referred to as "List @".

At this stage, the order of processing of the pages (Order_Tr) is preconfigured by the sequencing of the paths to the EMF files in the SPL file.

At the following step S23, it is tested whether at least one predetermined condition 43 relating to the context of the printing is valid, the context being tested through previously acquired context data 66.

The result of the test (67) of step S23 is then examined at the following step S24, so as to determine whether or not it is necessary to modify the preconfigured order of printing of the pages (Order_Tr=(1, . . . , n)).

If at least one predetermined condition is valid, the order of processing of the pages is modified in an appropriate fashion by acting on the sequencing of the paths in the list (List @) of the SPL file.

Finally, the normal printing process continues with this modified order (step S25).

The list (List @) of the paths to the EMF files, and the order of printing of the pages (Order_Tr), are stored in the registers 5200 of the RAM 52 (FIG. 3) when the program is run.

With the help of FIG. 7 et seq, 9 et seq, 13 et seq, a description will now be given of the functioning of the method of FIG. 6 with three examples of context data.

Figure 7:
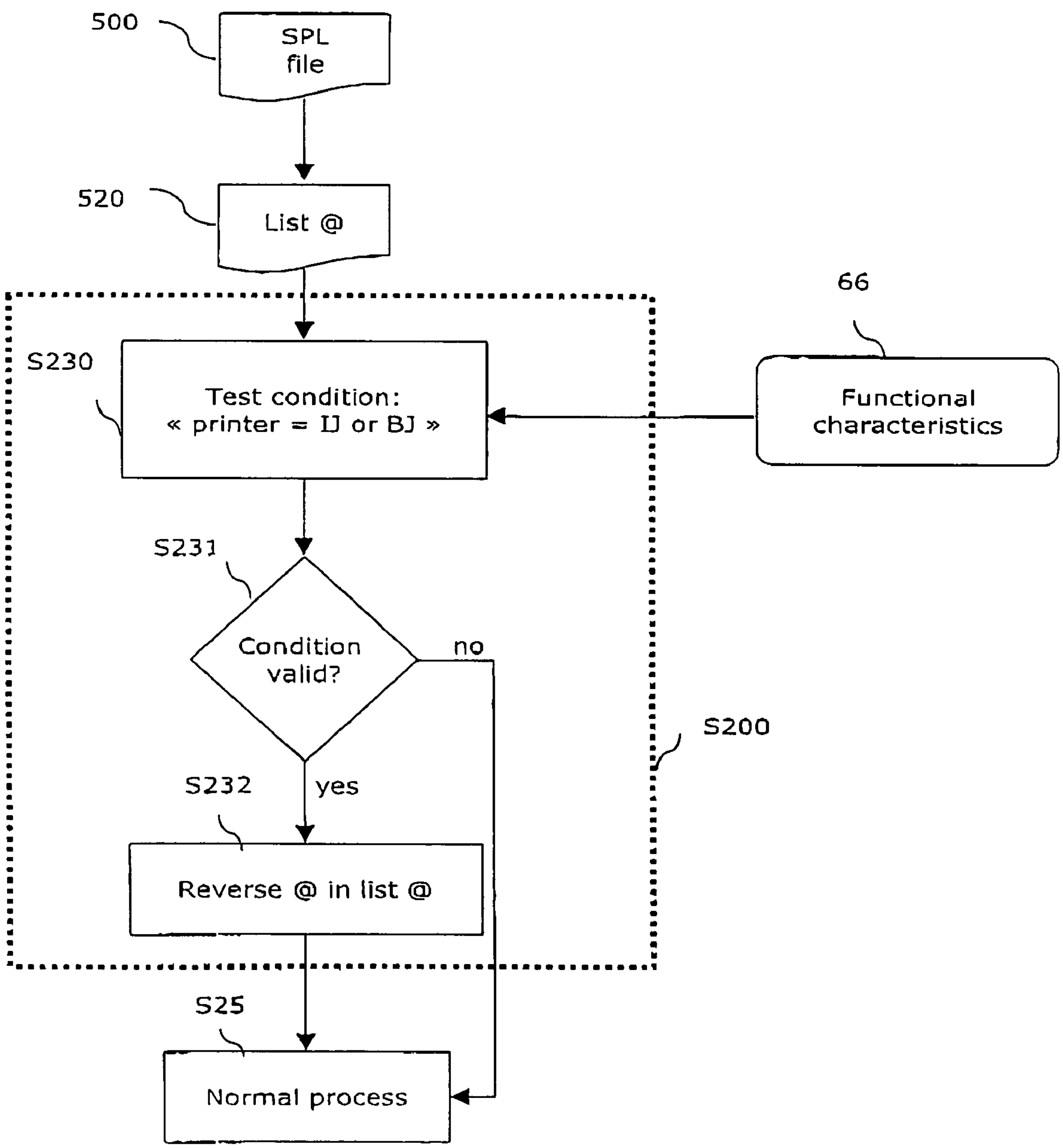
FIG. 7 depicts a flow diagram detailing steps S23 and S24 of the general flow diagram depicted in FIG. 6 according to a first example embodiment or process of reversing the pages according to the type of printer.

With reference to FIG. 7, a description will now be given of the first example embodiment in which the modification of the order of printing of the pages of a computer document is conditioned by functional characteristics of the printer. The flow diagram presented in FIG. 7 details steps S23 and S24 of the general flow diagram depicted in FIG. 6.

According to this first example embodiment, referred to here as the "process of reversing the pages according to the type of printer" (S200), as before, the first step is to obtain an SPL file in which is situated the list (List @) 520 of the access paths corresponding to the EMF files containing the graphical orders by page of the computer document to be printed.

As stated at the start of the present description, it is known that the majority of printers of the inkjet (IJ) type or bubblejet (BJ) type reverse the order of the pages in the printed document. This is due to the fact that, with this type of printer, the pages of the printed document are stacked one on top of the other with the printed face upwards.

It is therefore desirable for this type of printer to automatically configure the order of printing of pages of the computer document so that the document is directly printed with the pages in the correct order.

For this purpose, at step S230 of FIG. 7, the condition "the printer is of the inkjet (IJ) type or the printer is of the bubblejet (BJ) type" is tested. The context data 66 concerning this functional characteristic of the printer were previously obtained by the means of acquisition of functional characteristics of the printer from the printer driver.

At step S231 which follows, it is examined whether the aforementioned condition is valid or not. In the negative, the normal printing process continues (step S25) in a normal fashion without modification of the preconfigured order of printing of the pages.

On the other hand, if the printer is either a printer of the inkjet (IJ) type or a printer of the bubblejet (BJ) type then the order of the paths in the list (List @) of the SPL file is reversed at step S232. Then the normal process of printing continues with this reversed order of the paths in the SPL file.

Thus the order of printing of the pages of the computer document by the printer will be reversed and the printed document will be immediately usable by the user.

Figure 8:
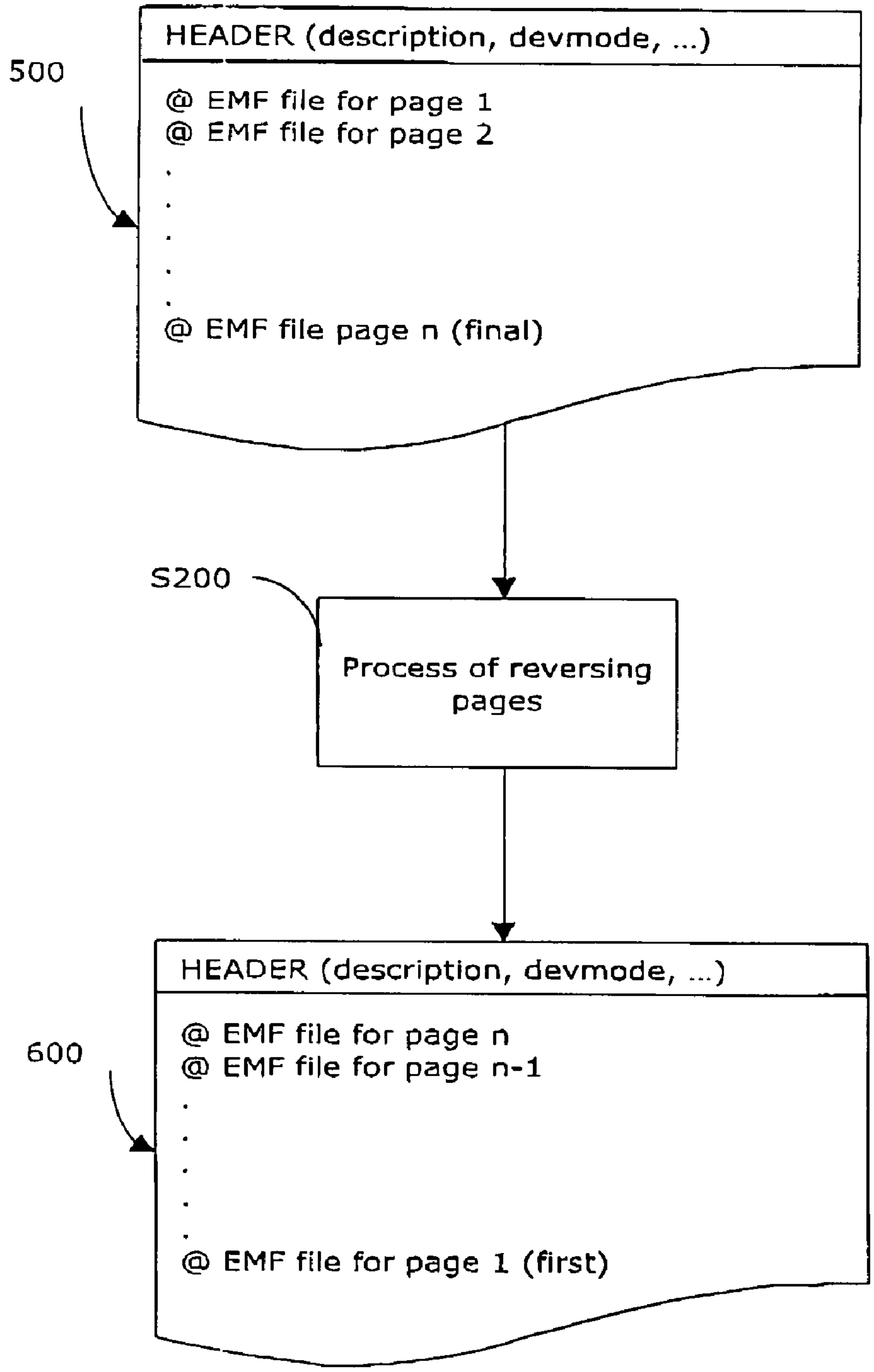
FIG. 8 illustrates how the page reversal process of FIG. 7 occurs on an SPL file.

FIG. 8 illustrates schematically how the process of reversing the pages S200 described in relation to FIG. 7 acts on the SPL file.

The SPL file 500 contains, before processing by the method according to the invention, a list of paths giving access to the EMF paths containing the graphical orders corresponding to the pages of a computer document containing n pages, to be printed. This list contains the access paths @ in increasing order of the pages, from page 1 to page n (from the start of the data area of the SPL file to the end of it).

The process of reversing the order of the pages S200 is applied to the SPL file 500 as described previously in relation to FIG. 7, the SPL file 600 thus modified comprises a list of access paths @ reversed with respect to the initial SPL file.

Thus the print manager 36 will supply to the graphical order manager 33 the graphical orders by blocks corresponding to the pages of the document, commencing with the last page of the document (page n).

Figure 9:
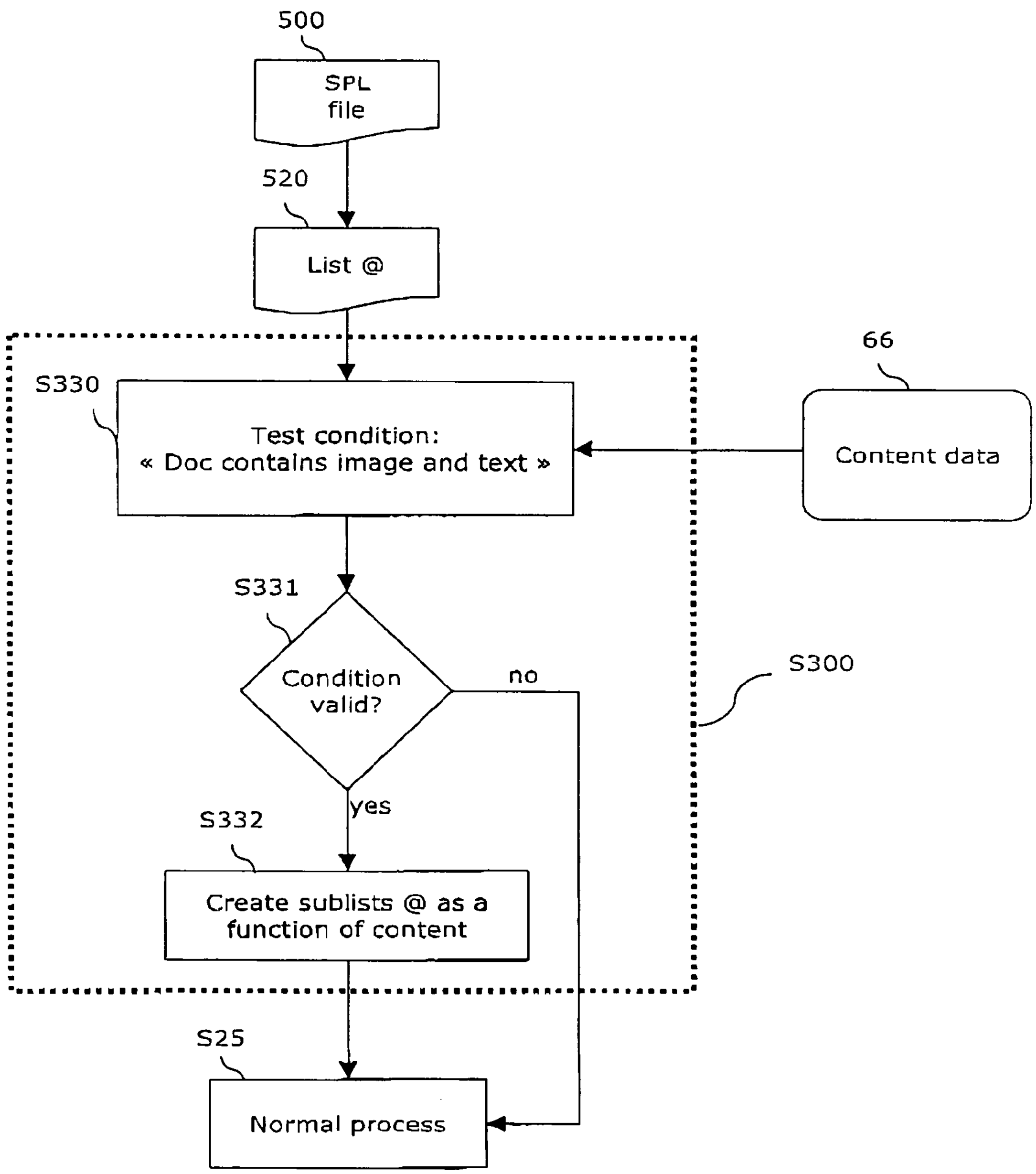
FIG. 9 depicts a flow diagram detailing steps S23 and S24 of the general flow diagram depicted in FIG. 6 according to a second example embodiment or process of rearrangement of the pages according to their content.

With reference to FIG. 9, a description will now be given of a second example embodiment in which the modification of the order of printing of the pages of the computer document is conditioned by the content of the pages of the computer document to be printed. The flow diagram presented in FIG. 9 also details steps S23 and S24 of the general flow diagram depicted in FIG. 6 in accordance with the second example embodiment described below.

In this second example embodiment, referred to here as the "process of arranging the order of the pages according to their content" S300, as before, the first step is to obtain an SPL file in which is situated the list (List @) 520 of the paths corresponding to the EMF files containing the graphical orders by page of the computer document to be printed.

For this purpose, at step S330, a condition relating to the content of the computer document is tested.

In the example embodiment described, so as to simplify the disclosure of the invention, this condition is as follows "the computer document to be printed contains text and images".

The context data 66 concerning the content of the pages of the computer document have previously been obtained by the means of analysing the content of the computer document from orders stored in the EMF files.

The method used by the means of analysing the content of the computer document will be detailed below in the description, in relation to FIG. 12.

At step S331 which follows, it is examined whether or not the aforementioned condition is valid. In the negative, the normal printing process continues (step S25) in a normal fashion without modification of the preconfigured order of the order of printing of the pages.

On the other hand, if the context data indicate that the computer document contains text and images (in bitmap mode), then the order of processing of the pages by the printer must be modified.

This is carried out at step S332, in which, in the list (List @) of the paths giving access to the EMF files, groupings of these paths are carried out according to the type of order contained in these files. The type of order contained in an EMF file is defined according to pre-established criteria.

Thus sub-lists of paths will be created, these sub-lists being ordered in the SPL file so that the pages whose content is printed more rapidly (text) are printed before the pages whose content is printed more slowly (images).

Thus, considering the following condition: "the computer document to be printed contains text and images", two sub-lists will therefore be created:

- a first sub-list containing the paths to the EMF files containing only orders of the "text" type;
- a second sub-list containing the paths to the EMF files which contain orders of the "image" type.

The first sub-list will be read firstly by the print manager 36, the second sub-list will be read thereafter.

In general terms, as many sub-lists can be provided as there are types of content in the pages of the computer document, and these sub-lists can be ordered in the SPL file so that the pages whose content is processed more rapidly by the computer peripheral in question are processed before those whose content is processed less rapidly.

Figure 10:
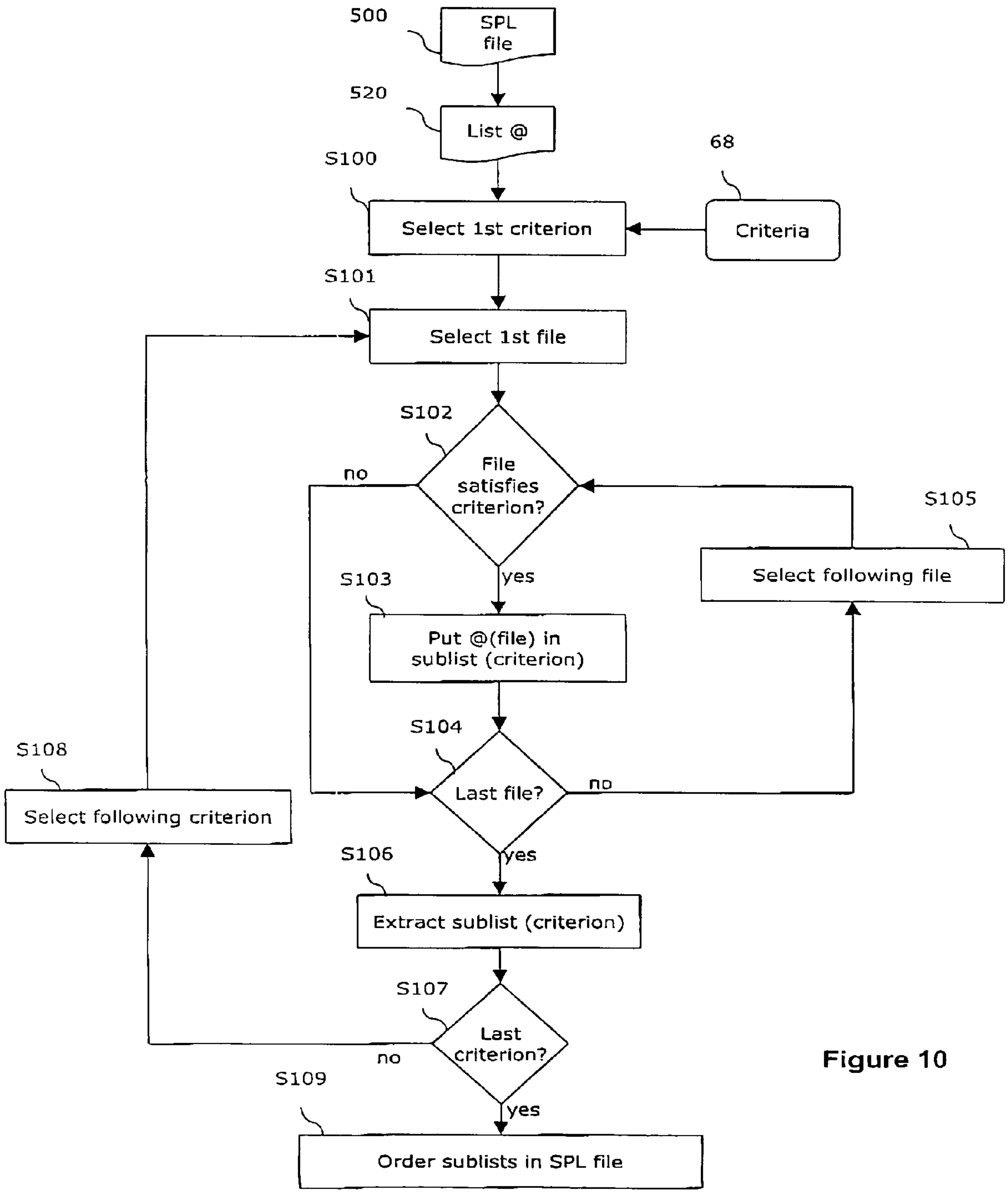
FIG. 10 depicts a flow diagram illustrating the method of creating sub-lists of access paths to the EMF files in the SPL file.

With reference to FIG. 10, details will now be given of the method of creating, in the SPL file, sub-lists of paths to the EMF files according to criteria relating to the type of order contained in the EMF files.

As before, the first step is to obtain an SPL file 500 in which there is the list (List @) 520 of the paths corresponding to the EMF files containing the graphical orders by page of the computer document to be printed.

A certain number of criteria 68 are also provided, for example in the form of a list in an electronic file. As a variant, these criteria can be coded in the code of the configuration program 5100. In another variant, the criteria can be supplied by a user through an adapted interface.

These criteria relate to the type of order contained in the EMF files. For example, these criteria may be:

Criterion 1: "file containing only orders of the text type";

Criterion 2: "file containing only orders of the image type";

Criterion 3: "file containing orders of the text type and image type";

etc.

At step S100 the first criterion is selected amongst the criteria to be examined (68). It is a case then of creating a sub-list in the SPL file of the paths corresponding to the EMF files satisfying the selected criterion ("current criterion").

At the following step S101, the first EMF file is selected from the first path in the list of paths (List @, 520).

At step S102, it is determined whether or not the selected EMF file ("current EMF file") satisfies the chosen criterion. In the negative, step S104 is passed to directly in order to determine whether the current EMF file is the last EMF file, that is to say the one in which the orders correspond to the last page of the computer document to be printed.

Conversely, if the EMF file satisfies the current criterion, step S103 is passed to, in which the path @(file) corresponding to the current EMF file is put in the sub-list associated with the current criterion: sub-list(criterion).

The path ("@(file)") associated with a particular EMF file, the sub-lists ("sub-list(criterion)") established from the given different criteria, are stored in the registers 5200 of the RAM 52 during the running of the program.

Next step S104 is passed to in order to determine whether the current EMF file is the last EMF file. In the negative, the following EMF file (S105) is selected, and then it is determined once again whether the current EMF file satisfies the current criterion (S102).

On the other hand, if the current EMF file is the last file to be examined, step S106 is passed to, in which the sub-list associated with the current criterion is extracted.

At the following step S107, it is determined whether the current criterion is the last criterion of the list of criteria (68). In the negative, the following criterion is selected at S108 and the process recommences with this new criterion.

Conversely, if the current criterion is the last criterion in the list 68, the final step S109 is passed to, in which the sub-lists obtained as explained above are ordered in the SPL file.

The sub-lists of paths are ordered so that the pages which are printed most rapidly having regard to their content are printed first.

For example, in the present case, the sub-list corresponding to criterion 1 ("text only") will be the first in the SPL file, the one corresponding to criterion 3 ("image and text") will be in the second position, and the one corresponding to criterion 2 ("image only") will be placed in the last position.

Figure 11:
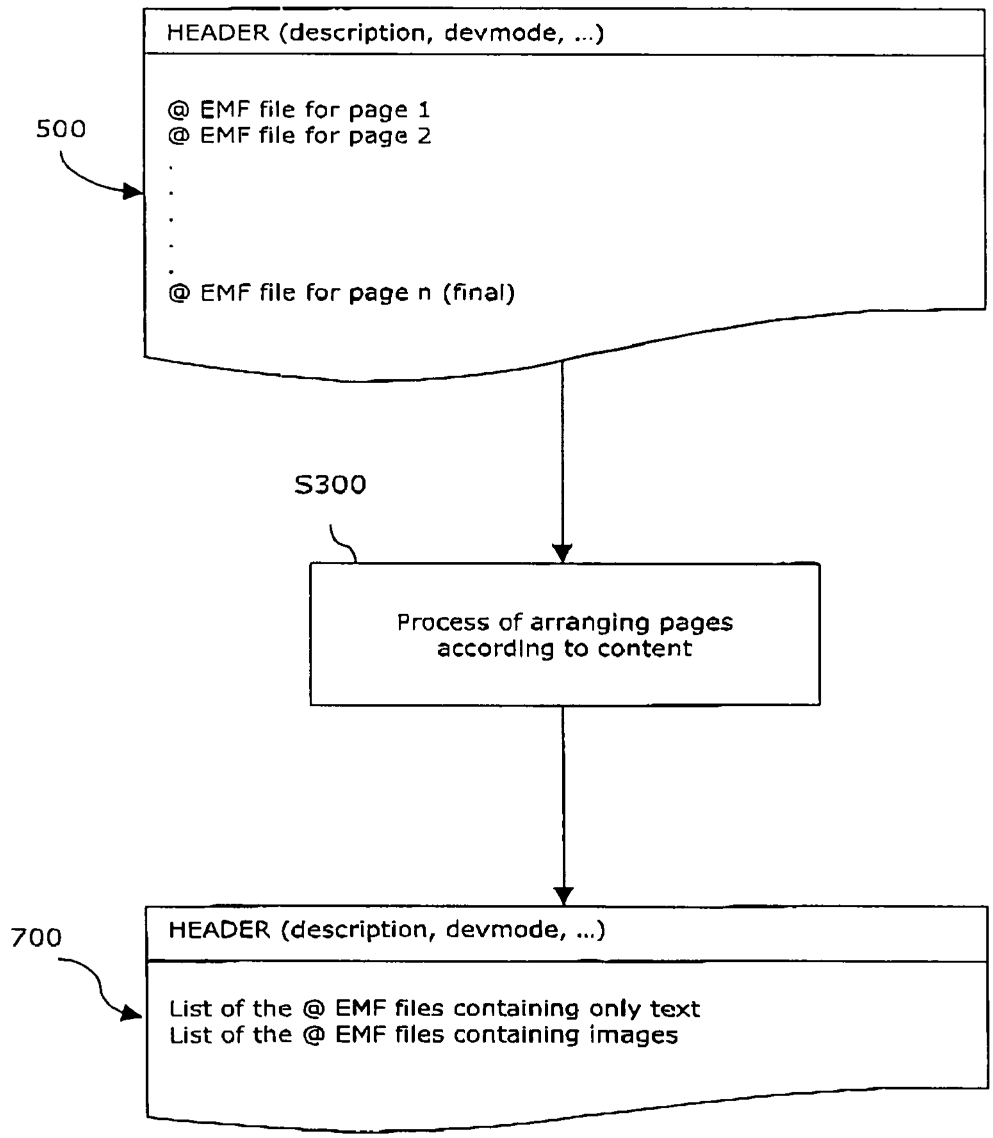
FIG. 11 illustrates in which way the process of arranging pages according to their content acts on the SPL file.

FIG. 11 illustrates schematically how the process of arranging the pages according to their content (S300), described above in relation to FIG. 10, acts on the SPL file.

The SPL file 500 contains, before processing by the method according to the invention, a list of paths to the EMF files containing the graphical orders corresponding to the pages of a computer document containing n pages, to be printed. This list contains the paths "@" in increasing order of the pages, from page 1 to page n (from the start of the data area of the SPL file to the end of it).

The process of arranging the pages according to their content S300 is applied to the SPL file 500 as described above in relation to FIG. 10.

The SPL file 700 thus modified comprises here two sub-lists of paths. The first corresponds to the EMF files containing solely orders relating to text. The second sub-list corresponds to the EMF files containing solely orders relating to images.

Figure 12:
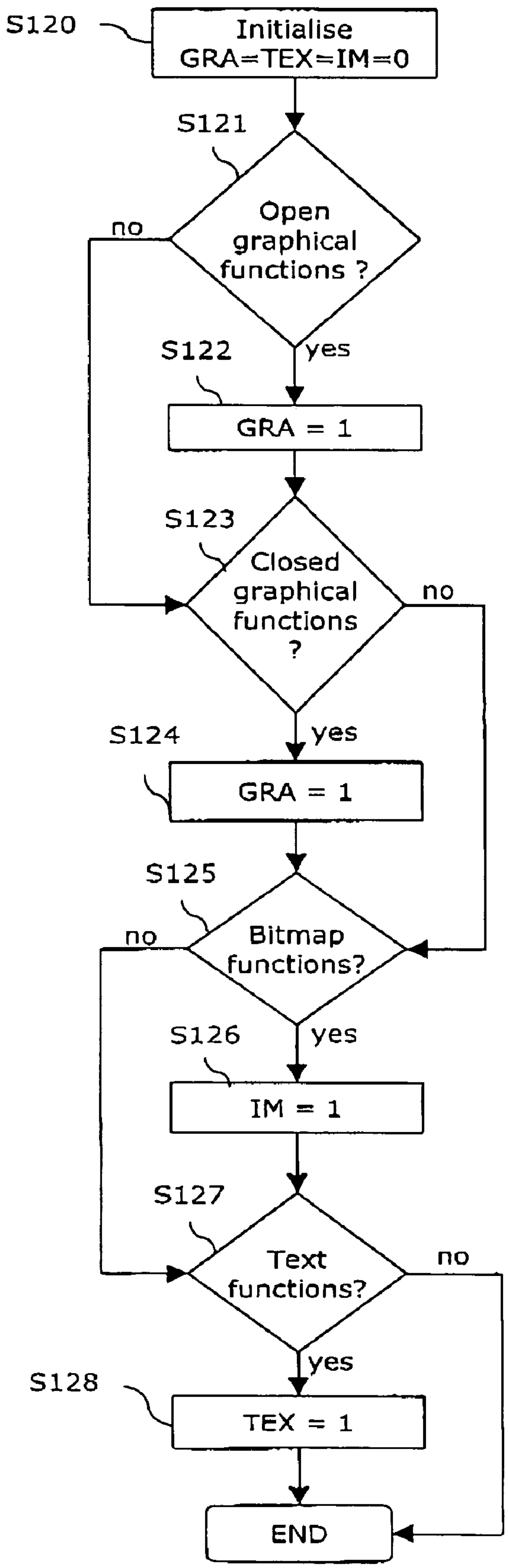
FIG. 12 depicts a flow diagram detailing the method of analysing the content of an EMF file in conformity with the invention.

With reference to FIG. 12, details will now be given of the method of analysing the content of a computer document implemented by the content analysis means, thus making it possible to obtain the context data (66) relating to the content of the computer document.

As illustrated in detail in FIG. 12, the method of analysing the content of the computer document comprises an initialisation step S120 in which indicators GRA, IM and TEX are initialised to an initial value, for example 0.

It is first of all checked, in a step S121, where there are open graphical functions in the EMF file, of the type consisting of a curve, a straight line, an arc etc.

In the affirmative, in a step S122 the value of the indicator GRA is modified by associating with it for example the value 1.

Whatever the response, it is next checked, in a step S123, whether there exists in the EMF file closed graphical functions of the type consisting of a circle, a rectangle, a polygon etc.

In the affirmative, in a step S124 the value of the indicator GRA is modified by associating with it for example the value 1.

Whatever the response, it is next checked, in a step S125, whether there exist representations in bitmap mode in the EMF file, signifying that an image exists.

In the affirmative, in a step S126, the value of the indicator IM is modified by associating with it for example the value 1.

Whatever the response, it is finally checked, in a step S127, whether there is text in the EMF file.

In the affirmative, in a step S128 the value of the indicator TEX is modified by associating with it for example the value 1.

The content of each EMF file is thus analysed automatically in order to know the graphical functions which are to be drawn by the printer. The above indicators GRA, TEX, IM associated with each EMF file will be used for obtaining data of the context of the printing relating to the content of the computer document. During the running of the program, these indicators are stored in the registers 5200 of the RAM 52 (FIG. 3) according to a preferred embodiment of the invention.

In relation to FIGS. 13 and 14, a description will now be given of a third example embodiment of the invention in which the process of reversing the pages according to the type of printer and of arranging the pages according to their content will be combined.

Figure 13:
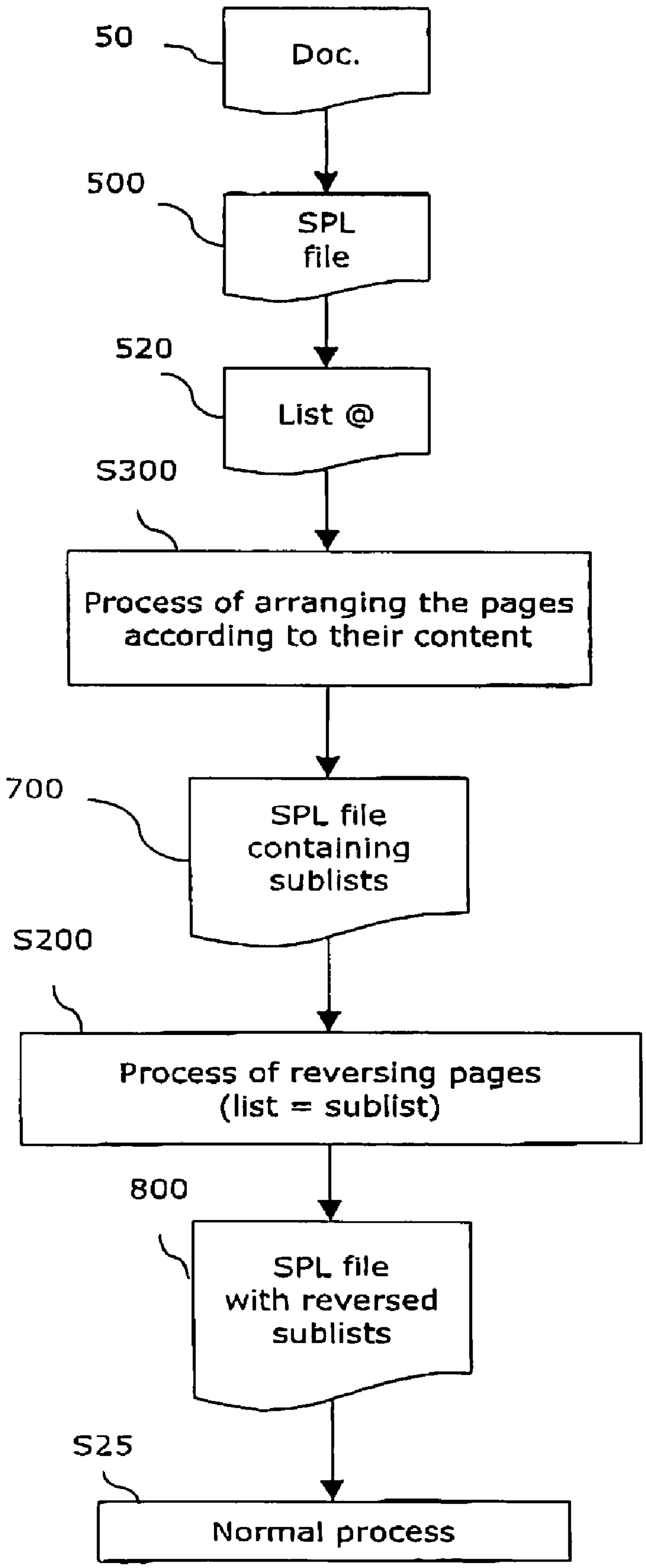
FIG. 13 depicts a flow diagram illustrating the automatic configuration method in accordance with the invention in which the process of reversing the pages according to the type of printer and the arrangement of the pages according to their content are combined according to a third example embodiment of the invention.

With reference to FIG. 13, as before, from an initial computer document 50, an SPL file 500 has been obtained, containing a list 520 of paths to the SPL files containing the graphical orders by page of the document.

At the following step S300, the process of arranging the pages according to their content, described above in relation to FIG. 9, is applied to the SPL file. An SPL file 700 is then obtained, containing sub-lists as described above.

Figure 14:
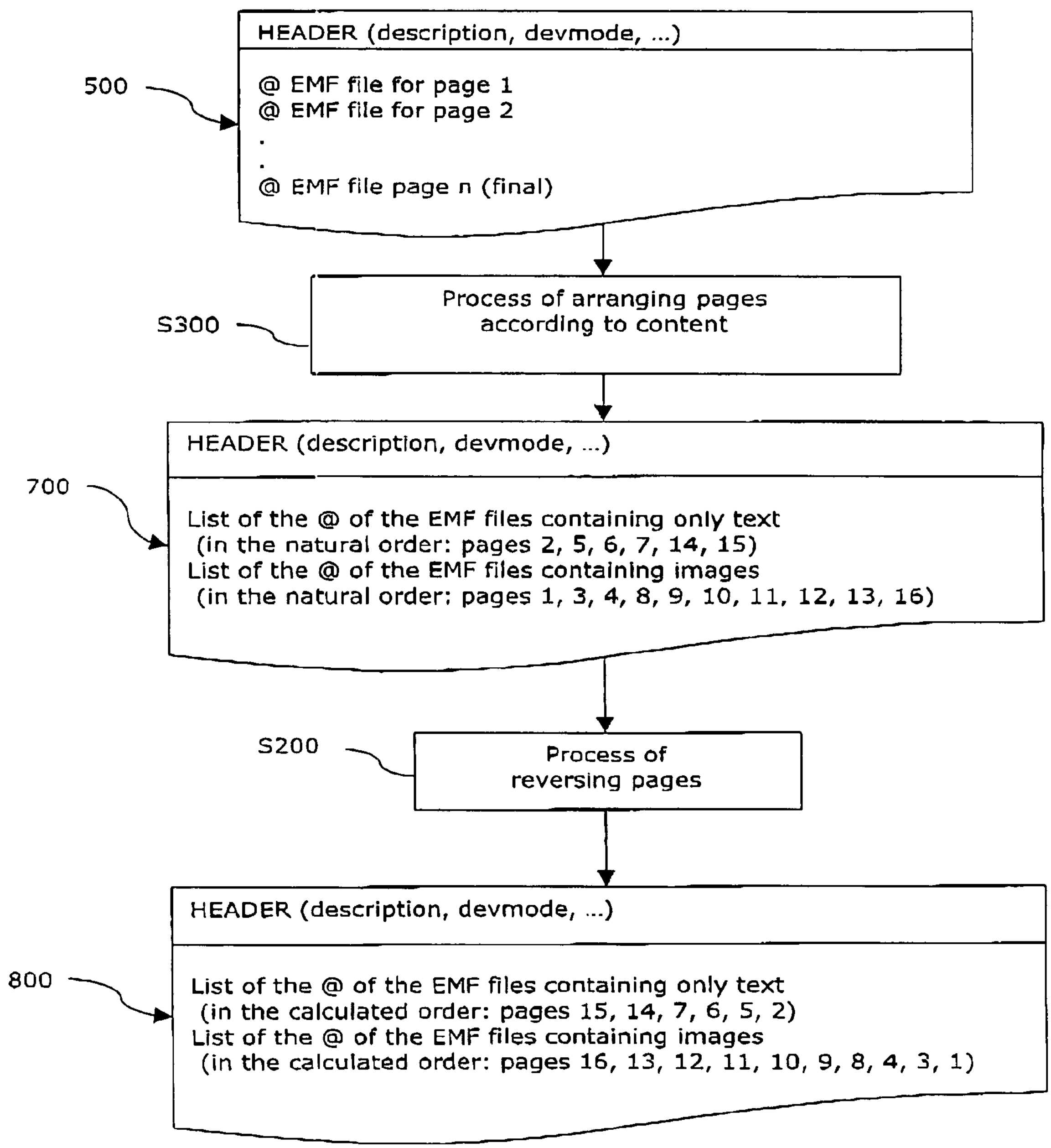
FIG. 14 illustrates the processing carried out on the SPL file by the application of the combination of the processes of reversal and arrangement of the pages according to their content, according to the third example embodiment of the invention.

FIG. 14 illustrates the processing carried out on the SPL file by applying the combination of the processes of reversal and arrangement of the pages according to their content.

The SPL file 700 of FIG. 13 is illustrated in FIG. 14. It can be seen that, at the end of the application of the process S300, the modified SPL file 700 contains two sub-lists. The first contains the paths to the EMF files corresponding to the pages containing only text.

By way of example, in FIG. 13, the computer document contains 16 pages. It can be seen that the first sub-list ("text only") obtained contains the path to the EMF files corresponding to pages 2, 5, 6, 7, 14, 15 in this order.

The second sub-list contains paths of the EMF files of pages 1, 4, 8, 9, 10, 11, 12, 13, 16. These pages contain only images. The paths are also ordered according to the logical (or natural) order of the pages in the computer document.

Let us return to FIG. 13. At step S200, the process of reversing the pages S200 is applied to the modified SPL file 700. This time, the reversal process is applied to each of the two sub-lists of paths created at step S300, as illustrated by the expression "list=sublist". An SPL file 800 is then obtained, containing "reversed" sub-lists.

The SPL file 800 is illustrated in FIG. 14. The SPL file 800 still contains the two sub-lists previously obtained during application of the process 300, but the order of the paths within these sub-lists is now reversed (calculated order).

Thus, in this third example embodiment of the invention, the implementation of the automatic configuration method according to the invention has the automatic optimisation of the order of processing of the pages of the document by printer of the "inkjet" type, for example. So that the user can recover the text pages before the pages containing images and directly in the correct order.

Thus the present invention makes it possible, by judiciously intercepting the graphical orders per unitary processing sub-part of the computer document before they are translated by the driver for the computer peripheral in question, to configure the latter so that the order of processing of these unitary sub-parts is optimised according to the content of the document and/or according to the functional characteristics of the peripheral.

The content of this document is also easily accessible by virtue of the analysis directly of the orders generated by the application at the time of processing by the peripheral.

The present invention thus makes it possible to automatically modify the configuration of the order of processing without acting directly on the driver.

On a given computer, a device for the automatic configuration of the processing order in accordance with the invention can be stored in the form of a program for each printer accessible through this computer, either locally, or through the communication network.

In another embodiment, the configuration device 30 according to the invention can be incorporated in whole or in part in the printer, for example in the printer 14 of the communication network 1 illustrated in FIG. 1.

All the means of acquiring context data, of storing graphical orders, of analysing the content of the document and of modifying the order of the preconfigured processing can be incorporated in the printer 14 and adapted to process the graphical orders addressed by a print manager before these graphical orders are actually translated by the driver, itself incorporated in the printer.

Naturally, many modifications can be made to the embodiments of the invention described above without departing from the scope of the invention.

Thus the processing peripheral can also be a facsimile machine or a modem, or a scanner.

In addition, the step of analysing the content of the document can include, in addition to the loading of an indicator revealing the presence of a type of graphical order, a step of calculating ratios, such as for example the ratio of the size of the image (in pixels) or a graphic present in the document, to the size of the print medium, so that, at the step of modifying the order of processing, this is carried out both by taking into account the value of the indicators but also the value of these ratios. Thus a value of the indicator IM equal to 1 can be ignored (that is to say the image configuration will not be chosen) if the ratio of the size of the image to the size of the paper is less than a certain value.

What is claimed is:

1. A method of controlling processing of a computer document by a computer peripheral, the computer document comprises a plurality of sub-parts to which is associated a predetermined order of processing, said method comprising the steps of:

acquiring context data indicative of at least one of a type of information contained in a sub-part of the plurality of sub-parts and an operating characteristic of the computer peripheral; and modifying the predetermined order of processing by the computer peripheral of the sub-parts of the computer document according to the acquired context data.

2. A method according to claim 1, wherein said acquiring step includes analyzing the content of the sub-parts for determining the types of information contained in each sub-part.

3. A method according to claim 2, wherein said modifying step is performed according to a combination of types of information contained in each sub-part.

4. A method according to claim 3, wherein the sub-parts containing a combination of types of information that is faster to process than the combinations of types of information contained in other sub-parts are processed before the processing of the other sub-parts.

5. A method according to claim 2, wherein said acquiring step includes calculating, for each of at least one of the types of information contained in a sub-part of the computer document, a ratio representative of the proportion of the type of information within a combination of types of information in the sub-part.

6. A method according to claim 5, wherein said modifying step is performed according to the combination of types of information contained in each sub-part and the calculated ratio for each of the at least one of the types of information contained in the combination.

7. A method according to claim 6, wherein the types of information where the calculated ratio is under a predetermined threshold are not taken into account in modifying the predetermined order of processing of the sub-parts.

8. A method of controlling printing of a computer document by a printer, the computer document comprising a plurality of pages to which is associated a predetermined printing order, said method comprising the steps of:

acquiring context data indicative of at least one of a type of information contained in a page and an operating characteristic of the printer; and modifying a predetermined printing order of the pages of the computer document according to the acquired context data.

9. A method according to claim 8, wherein said acquiring step includes analyzing the content of the pages for determining the types of information contained in each page.

10. A method according to claim 9, wherein said acquiring step includes calculating, for each of at least one of the types of information contained in a page of the computer document, the size of the area occupied by the type of information in the page.

11. A method according to claim 10, wherein said modifying step is performed according to a combination of types of information contained in the pages of the computer document and the calculated size of each of the at least one of the types of information contained in the combination.

12. A method according to claim 11, wherein the types of information where the calculated size is under a predetermined threshold are not taken into account for modifying the predetermined printing order of the pages.

13. A device for controlling processing of a computer document by a computer peripheral, the computer document comprising a plurality of sub-parts to which is associated a predetermined order of processing, said device comprising:

acquisition means for acquiring context data indicative of at least one of a type of information contained in a sub-part and an operating characteristic of the computer peripheral; and modification means for modifying the predetermined order of processing by the computer peripheral of the sub-parts of the computer document according to the acquired context data.

14. A device for controlling the printing of a computer document by a printer, the computer document comprising a plurality of pages to which is associated a predetermined printing order, said device comprising:

acquisition means for acquiring context data indicative of at least one of a type of information contained in a page and an operating characteristic of the printer; and modification means for modifying the predetermined printing order of the pages of the computer document according to the acquired context data.

15. A device according to claim 14, wherein said acquisition means comprises analyzing means for analyzing the content of the pages for determining the types of information contained in each page.

16. A device according to claim 15, wherein said acquisition means contains calculation means for calculating, for each of at least one of the types of information contained in a page of the computer document, the size of the area occupied by the type of information in the page.

17. A device according to claim 16, wherein said modification means performs modification of the predetermined printing order according to a combination of types of information contained in the pages of the computer document and the calculated size of each of the at least one of the types of information contained in the combination.

18. A device according to claim 17, wherein the types of information for which the calculated size is under a predetermined threshold are not taken into account in modifying the predetermined printing order of the pages.

19. A computer-readable storage medium storing a computer program product for controlling processing of a computer document by a computer peripheral, the computer document comprising a plurality of sub-parts to which is associated a predetermined order of processing, said program comprising:

code for acquiring context data indicative of at least one of a type of information contained in a sub-part and an operating characteristic of the computer peripheral; and code for modifying the predetermined order of processing by the computer peripheral of the sub-parts of the computer document according to the acquired context data.

* * * * *